C. S. LOCKWOOD.
CASING LOCK FOR ROLLER BEARINGS.
APPLICATION FILED JAN. 4, 1912.
1,058,767.
Patented Apr. 15, 1913.
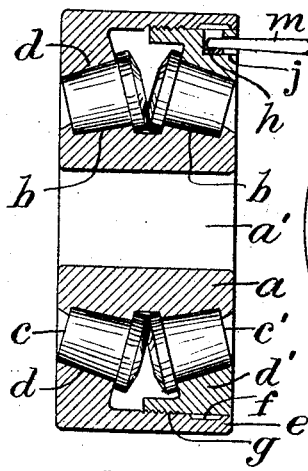
Fig. 1.
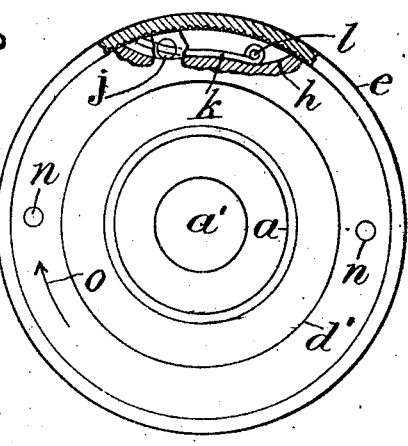
Fig. 2.
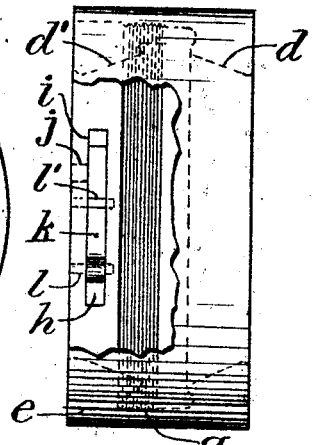
Fig. 3.
Fig. 4.
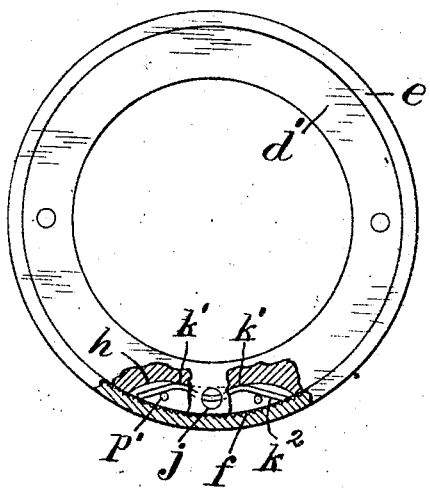
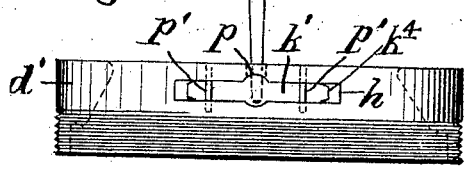
Fig. 5.
Witnesses:
L. Lee.
Walter Greenbaum.
Inventor
Charles S. Lockwood,
per Thomas S. Crane, Atty.

UNITED STATES PATENT OFFICE.

CHARLES S. LOCKWOOD, OF NEWARK, NEW JERSEY, ASSIGNOR TO HYATT ROLLER BEARING COMPANY, OF HARRISON, NEW JERSEY, A CORPORATION OF NEW JERSEY.

CASING-LOCK FOR ROLLER-BEARINGS.

1,058,767. Specification of Letters Patent. Patented Apr. 15, 1913.

Application filed January 4, 1912. Serial No. 669,450.

*To all whom it may concern:*

Be it known that I, CHARLES S. LOCKWOOD, a citizen of the United States, residing at 289 Market street, Newark, county of Essex, and State of New Jersey, have invented certain new and useful Improvements in Casing-Locks for Roller-Bearings, fully described and represented in the following specification and the accompanying drawings, forming a part of the same.

The present invention relates to self-contained roller-bearings having a hub for application to a shaft, a casing inclosing a set of rolls upon the hub, and the exterior of the casing of cylindrical form adapted to fit into a cylindrical socket in any mechanism where such a bearing may be required. In such bearings it is common to make the hub of double conical shape with the bases of the cones at the middle of the hub, the rolls of corresponding tapering form, and the casing with two tapering seats adapted to embrace the rolls when assembled upon the hub.

For applying the casing to two sets of rolls upon a doubly conical hub, it is necessary that one of the seats in the casing should be removable, and in order to make such removable seat adjustable within the hub it is common to make one end of the casing with an internally threaded shell and to screw such section within the shell.

The present invention comprises a novel means for locking the movable section within the casing by means of a spring-pawl, and the novelty of the construction consists in the formation of the removable inner section with a peripheral slot closed at its ends and sides, having a transverse perforation and a leaf spring-pawl secured in such slot to engage the ratchet-teeth and means operating through the perforation to depress the pawl when required.

The spring-pawl may be held in the slot by a pin extended across the slot and a perforation is formed through the outer wall of the slot adjacent to the edge of the ratchet, so that a pin may be inserted therein to press one end of the pawl outwardly and retract its working end from engagement with the ratchet-teeth in the shell.

The invention is shown in the annexed drawing, in which—

Figure 1 is a longitudinal section of a bearing provided with the improvements; Fig. 2 is an end view of such bearing with a portion of the inner and outer sections broken away to the nearer side of the peripheral slot; and Fig. 3 is an edge view of the bearing with the shell broken away to expose the periphery of the removable section. Figs. 2 and 3 show a leaf-spring with one working end operating as a ratchet-pawl. Fig. 4 is an end view of the inner and outer sections showing a leaf-spring having two working ends so as to lock the inner section when turned in either direction; Fig. 5 is an edge view of the inner section represented in Fig. 4.

In Figs. 1 to 3, $a$ designates the hub having double conical seats $b$ with rolls $c$ and $c'$ fitted thereto; the hub having a bore $a'$ for securing it upon a shaft. The casing, with cylindrical exterior, is provided at one end with the tapering seat $d$ fitted to embrace the rolls $c$ and at the other end with the cylindrical shell $e$ having internal ratchet-teeth $f$ near its outer end. Adjacent to the ratchet-teeth, farther within the shell, is a screw-thread $g$; and a movable section $d'$ having a tapering seat to embrace the rolls $c'$ is provided with exterior thread to fit the thread $g$, and with a peripheral slot $h$ whose outer wall $i$ is formed with a perforation $j$. The slot is closed at both sides and at both ends, and a leaf-spring $k$ is fitted to rest upon the bottom of the slot and held from displacement therein by pins $l, l'$. The leaf-spring forms a single ratchet-pawl by the engagement of its free end with the ratchet-teeth $f$, being sustained by elastic pressure upon the bottom of the slot. The perforation $j$ is disposed so as to intersect the leaf-spring, thus exposing its edge to view, and a pointed pin $m$ shown in Fig. 1 may thus be wedged against the outer side of the ratchet-spring to crowd its working end out of the ratchet-teeth $f$. The inner section $d'$ is provided with holes $n$ to receive a spanner by which it may be turned within the shell $e$ in the direction of the arrow $o$, to adjust the casing to the rolls. During such adjustment, the ratchet-pawl clicks over the ratchet-teeth $f$ and prevents the inner section from turning backwardly when adjusted.

It will be observed that no part of the ratchet mechanism is exposed upon the exterior of the roller-bearing at any point, and it therefore permits the bearing without any obstruction to be inserted into a cylindrical socket fitted to its exterior, and the absence of any projections upon the casing prevents the rotation of adjacent parts of the mechanism from accidentally engaging such projections and breaking them or causing undesirable movements of the parts. The single ratchet-pawl shown in Fig. 2 is not however adapted to positively lock the inner section against rotation in both directions.

Figs. 4 and 5 show means to positively prevent the rotation of the inner section in either direction when adjusted. These figures show the leaf-spring arched in the middle to clear the bottom of the slot and having shoulders $k'$ at opposite sides of the arched portion to rest upon the bottom of the slot, to hold the ends $k^4$ of the spring in elastic engagement with the ratchet-teeth $f$. The spring is held from end movement by a lateral enlargement at the middle of its length fitted to a lateral recess $p$ in the wall of the slot, and each end of the spring is held in working position by a pin $p'$. The arch at the middle of the spring extends across the perforation $j$ through the outer wall of the slot, thus permitting the tapering pin $m$ to be wedged beneath the inner side of the arch, thus prying the arch outwardly and moving the ratchet ends of the spring out of engagement with the ratchet-teeth $f$. The pins $p'$ serve as fulcra, by their contact with the outer sides of the spring, when thus pressed by the wedge-shaped pin. With the double pawl thus retracted from the ratchet-teeth $f$, the inner section $d'$ can be properly adjusted, and the withdrawal of the wedge then permits both ends of the spring to engage the ratchet-teeth to positively prevent rotation in either direction.

It will be observed that with the construction shown in Fig. 2, the insertion of the pin or wedge $m$ operates upon the leaf-spring to disengage it from the ratchet-teeth $f$ while it performs precisely the same function in Fig. 4, retracting both ends of the leaf-spring simultaneously by pressing the middle of the leaf-spring upwardly. The construction thus performs the same function whether the leaf-spring be made to engage the ratchet-teeth at one or both ends.

Having thus set forth the nature of the invention what is claimed herein is:

1. In a roller bearing, an adjustable self-locking casing having an outer section with a cylindrical exterior and a tapering roll-seat $d$ within one end and a shell $e$ upon the other end, and the shell provided internally with a screw-thread $g$ and an adjacent series of ratchet-teeth $f$, an inner section $d'$ fitted adjustably to such screw-thread and having a tapering roll-seat upon its inner side, and provided with a peripheral slot inclosed upon both ends and sides and having a transverse perforation through its outer wall, a leaf-spring within the slot extended across the said perforation and supported upon the bottom of the slot and bent to extend across the said perforation and its end pressed elastically upon the ratchet-teeth, and means for retaining the spring in the slot, whereby means may operate through the perforation to retract the end of the leaf-spring from the ratchet-teeth.

2. In a roller bearing, an adjustable self-locking casing having an outer section with a cylindrical exterior and tapering roll-seat $d$ within one end and a shell $e$ upon the other end and the shell provided internally with a screw-thread $g$ and an adjacent series of ratchet-teeth $f$, an inner section $d'$ fitted adjustably to such screw-thread and having a tapering roll-seat upon its inner side, and provided with a peripheral slot $h$ inclosed upon both ends and sides and having a transverse perforation through its outer wall and a lateral recess at the middle of its length, a double-ended leaf-spring within the slot having an enlargement fitted to the said recess, the spring being extended across the said perforation and having its ends bent outwardly to engage the ratchet-teeth, and pins inserted through the wall of the slot to retain the spring therein, the spring thus operating as a double ratchet, substantially as herein set forth.

In testimony whereof I have hereunto set my hand in the presence of two subscribing witnesses.

CHARLES S. LOCKWOOD.

Witnesses:
 G. C. STULTS,
 ETHEL WILLIAMS.